United States Patent [19]

Steimke et al.

[11] Patent Number: 5,431,433
[45] Date of Patent: Jul. 11, 1995

[54] FASTENERLESS TETHERED DEPLOYMENT DOOR FOR PASSENGER-SIDE AIRBAG MODULE

[75] Inventors: Daniel L. Steimke; Paul M. Fanning, both of Ogden; Edward Friery, Coalville, all of Utah

[73] Assignee: Morton International, Inc., Chicago, Ill.

[21] Appl. No.: 236,553

[22] Filed: May 2, 1994

[51] Int. Cl.⁶ .............................................. B60R 21/20
[52] U.S. Cl. ................................................... 280/728.3
[58] Field of Search ............... 280/728 B, 728 A, 732, 280/731, 730 R, 728 R

[56] References Cited

U.S. PATENT DOCUMENTS

| | | | |
|---|---|---|---|
| 3,708,179 | 1/1973 | Hulten | 280/732 |
| 4,911,471 | 3/1990 | Hirabayashi | 280/732 |
| 4,941,678 | 7/1990 | Lauritzen et al. | 280/732 |
| 5,064,217 | 11/1991 | Shiraki | 280/728 B |
| 5,069,477 | 12/1991 | Shiraki | 280/728 B |
| 5,150,919 | 9/1992 | Sakakida et al. | 280/732 |
| 5,183,288 | 2/1993 | Inada et al. | 280/728 B |
| 5,190,314 | 3/1993 | Takasugi | 280/732 |
| 5,209,519 | 5/1993 | Shiga et al. | 280/728 A |
| 5,332,257 | 7/1994 | Rogers et al. | 280/728 B |

FOREIGN PATENT DOCUMENTS

| | | | |
|---|---|---|---|
| 4059450 | 2/1992 | Japan | 280/728 B |
| 5000648 | 1/1993 | Japan | 280/728 A |

*Primary Examiner*—Margaret A. Focarino
*Assistant Examiner*—Peter C. English
*Attorney, Agent, or Firm*—George W. Rauchfuss, Jr.; Gerald K. White

[57] ABSTRACT

A passenger-side airbag module assembly consisting of a reaction canister and deployment door is assembled into a motor vehicle's instrument panel. The breakaway deployment door of the airbag module fits flush with the surrounding instrument panel of the vehicle. The reaction canister containing the folded airbag is positioned behind the deployment door and rigidly mounted to the instrument panel sub-structure. The connection between the deployment door and the reaction canister comprises a pair of flexible tethers. Each tether has one edge secured to a different sidewall of the canister. The other edge of each tether engages a portion of the deployment door.

20 Claims, 3 Drawing Sheets

FASTENERLESS TETHERED DEPLOYMENT DOOR FOR PASSENGER-SIDE AIRBAG MODULE

TECHNICAL FIELD

This invention relates to an inflation passive restraint system for use in a motor vehicle for restraining the movement of a seated occupant during a collision. More particularly, it relates to an improved structure for securing the instrument panel deployment door to the reaction canister.

BACKGROUND ART

Passenger-side airbag modules are normally positioned behind the instrument panel of a vehicle directly ahead of the normal location of a seated passenger. An airbag deployment door is part of the airbag module and fits flush with the surrounding instrument panel. The door has a weakened portion or tear line which bursts upon airbag deployment to form a door to admit the inflated bag.

The airbag module, which is positioned directly behind the deployment door, comprises a trough-shaped reaction canister, which is rigidly attached to the instrument panel sub-structure. The reaction canister houses an inflator in its base and the folded airbag between its two sidewalls. The airbag is retained in such a manner that its open mouth is positioned to receive gases produced by the inflator upon activation by a collision sensor. It is important that the reaction canister be strongly attached to the deployment door in order to prevent the door, or portions thereof, from detaching and becoming projectiles under the influence of the deploying airbag. However, it is also important, especially to the automotive purchaser, that the surface of the instrument panel be well-fitted and finished to the deployment door portion. This has increased the difficulty of mounting the module assembly behind the instrument panel using standard fasteners. This problem is increased under the space constraints faced by the person assembling the reaction canister to the instrument panel.

Accordingly, it is a primary object of the present invention to provide an improved system for assembling the deployment door to the reaction canister. Another object is to provide such a system which permits relative movement between the canister and the door while eliminating tolerance stack up problems of various parts and retaining structural integrity. Another object is to provide such a system which avoids the need for conventional fasteners. Another objective is to provide such a system which does not rattle when shaken. Another objective is to provide such a system which allows fast, easy assembly. Other objects, features, and advantages will become apparent from the following description and appended claims.

DISCLOSURE OF INVENTION

In accordance with the present invention, the deployment door and the reaction canister are interconnected by means of a pair of wide, flexible tethers. Each tether carries a rod which is retained by a channel in each of the respective canister sidewalls and deployment door edges. One of the rod/channel connections is made by a snap-fit engagement.

BEST MODE FOR CARRYING OUT THE INVENTION

Figure 1:
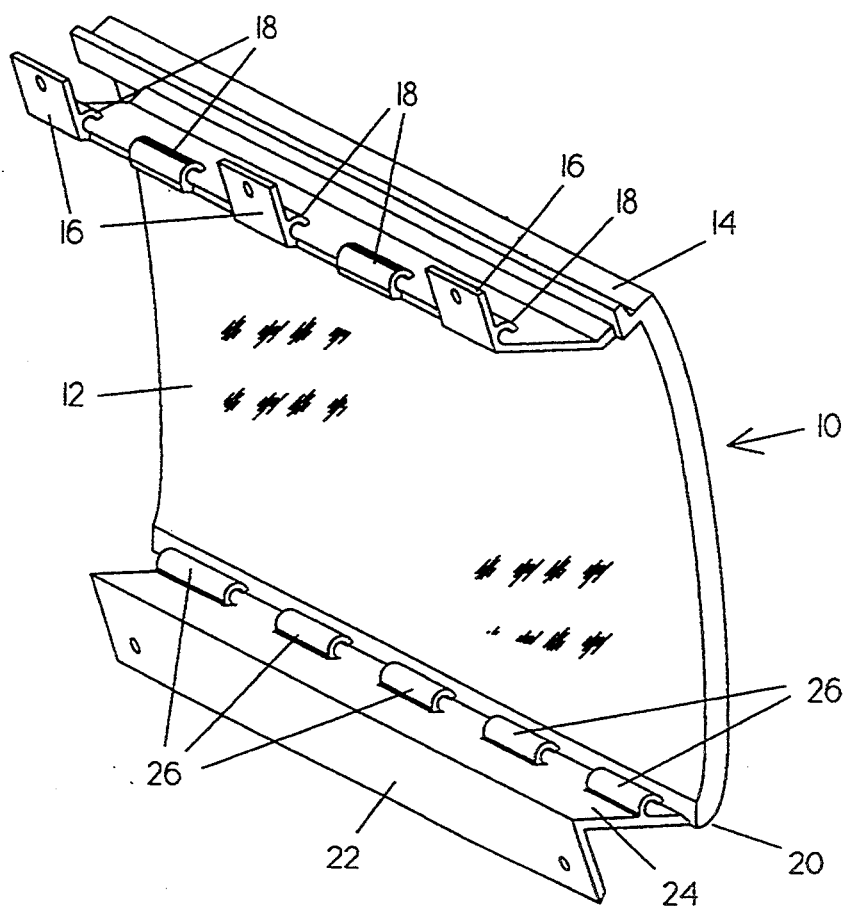
FIG. 1 is an isometric view of the rear of a deployment door of this invention.

FIG. 1 illustrates a deployment door 10 usable with this invention. Its main body 12 forms a portion of the instrument panel. The door is essentially rectangular and has a top edge 14 which carries a plurality of mounting brackets 16 and a plurality of semi-cylindrical clip members 18. The clip members 18 are axially aligned to form a single segmented channel. The bottom edge 20 of the door 10 carries a mounting bracket 22 on an extension shelf 24. The extension shelf 24 portion of the door edge also carries a plurality of clip members 26 which are axially aligned similarly to clip members 18 to form a lower segmented channel. At the juncture of extension shelf 24 with the bottom edge 20 of the door is a weakened portion forming a tearline 28 which can be most clearly seen in FIG. 4.

Figure 2:
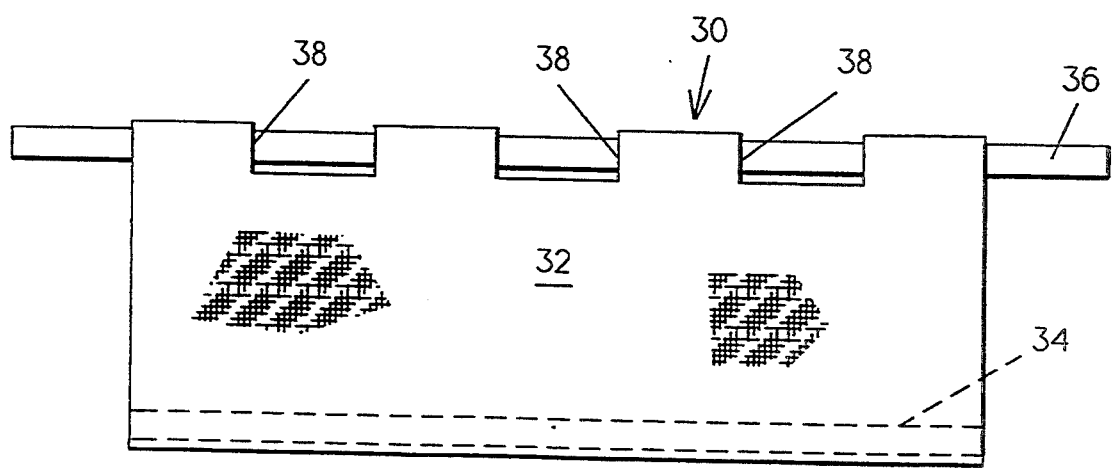
FIG. 2 is a plan view of a tether usable in this invention.

Turning now to FIG. 2, there is illustrated one of the two substantially identical tethers 30 used in this invention. It comprises a substantially rectangular flexible body 32. Any suitably flexible and strong material may be employed. In one embodiment airbag material was used comprising 420 denier 49×49 nylon 6.6. One of the elongated edges of the tether body 32 is folded over and sewn or otherwise secured to retain therein a rod 34 which generally has a length about equal to the width of tether 30. The opposing elongated edge of the tether body 32 is also folded over and sewn or otherwise secured about a longer rod 36 which has a length exceeding the width of tether 30. However, the edge of tether body 32 which extends around the rod 36 is cut to form slots 38 which periodically expose the rod 36.

Figure 3:
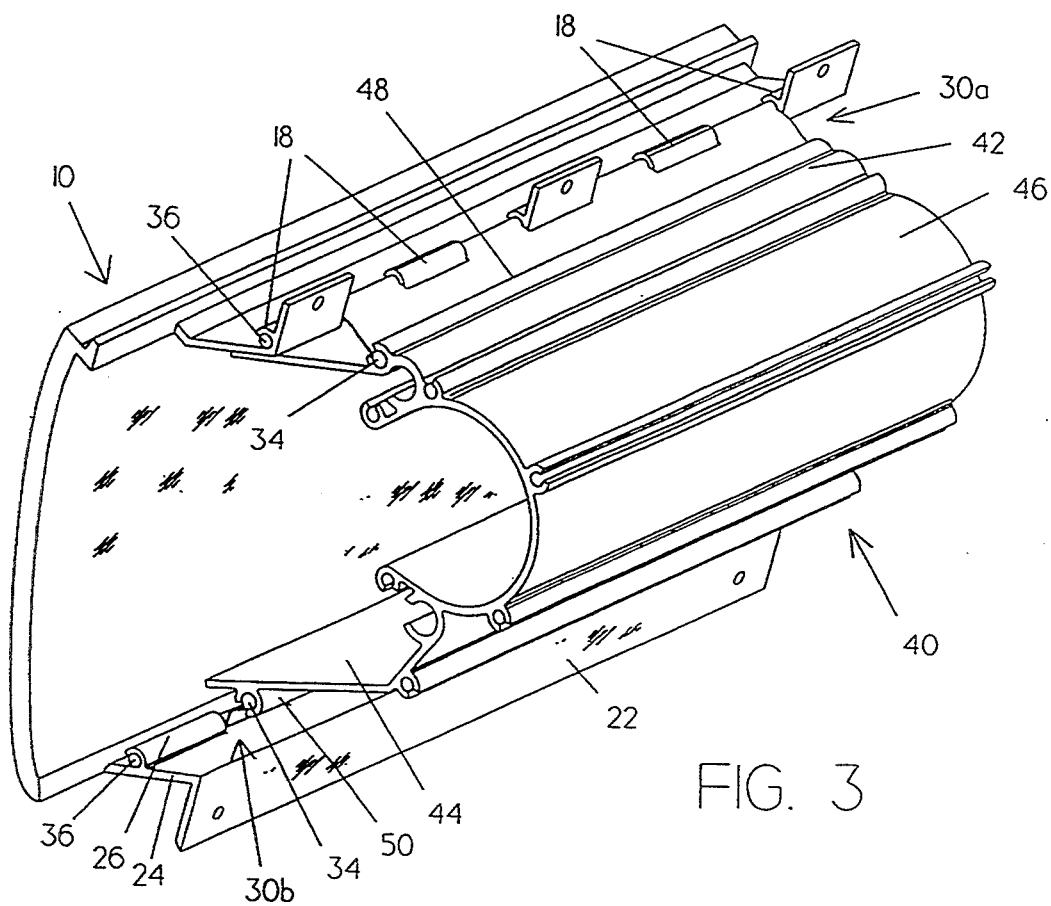
FIG. 3 is an isometric view of a reaction canister joined to a deployment door by means of the tethers of this invention, the end plates of the reaction canister being omitted.
Figure 4:
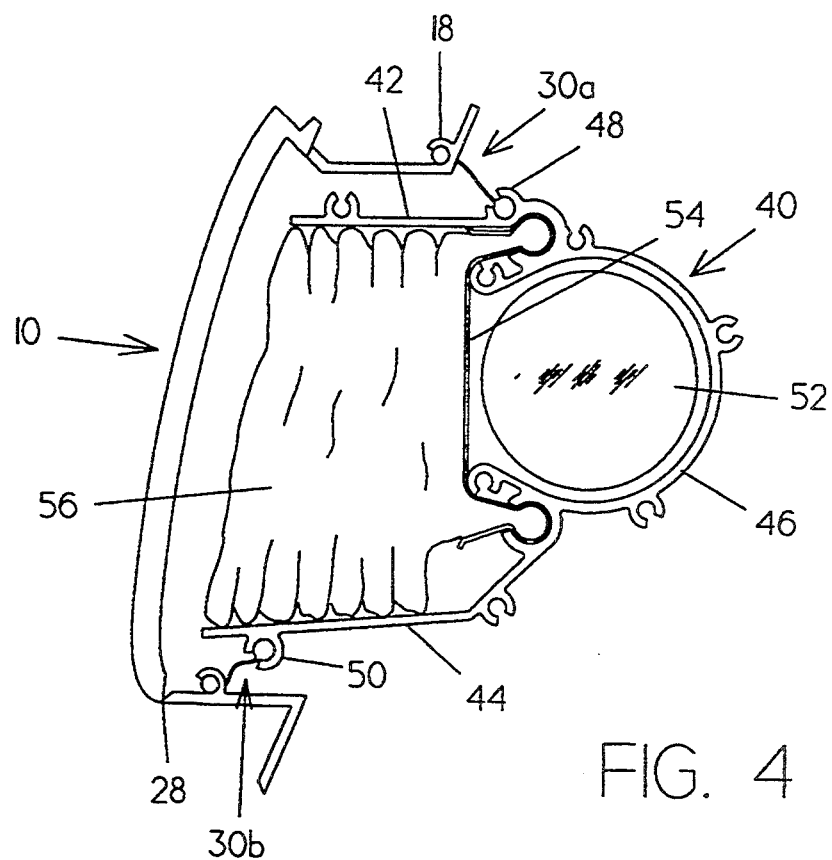
FIG. 4 is an end view of an airbag module in accordance with this invention, with the end plate of the reaction canister removed to illustrate the internal construction.

FIG. 3 illustrates the deployment door 10 secured to a reaction canister 40 by two tethers 30a, 30b. The reaction canister 40 is in the conventional form of a trough having a first sidewall 42, a second sidewall 44, and a semi-cylindrical base 46. The two sidewalls, together with two end plates (not shown), form an open top. (Although the term "top" is employed, it is not a term of limitation. In fact, the trough may be oriented in any position. As shown in FIG. 4, it is horizontal.) A longitudinal semi-cylindrical channel 48 having a longitudinal slot opening is formed in the first sidewall 42. A similar channel 50 having a longitudinal slot opening is formed in the second sidewall 44.

The door 10 is attached to the reaction canister 40 by sliding the edge of one tether 30a carrying the shorter rod 34 into the end of the semi-cylindrical channel 48 with the tether body extending through the slot opening. The corresponding rod-containing edge of the other tether 30b is similarly inserted into the end of the channel 50 on the second sidewall 44. Thereafter, the reaction canister 40 is approximately aligned behind the deployment door 10 and the longer rods 36 of each tether are inserted by snap-fit engagement into the clip members 18 carried by the top edge 14 of the door and the clip members 26 carried by the bottom edge 20 of the door.

The lengths of the elongated edges of rectangular tethers 30a and 30b are shown to be substantially equivalent to the lengths of sidewalls 42 and 44 of reaction canister 40. However, the lengths of the elongated edges of the tethers, or the lengths of rods 34, 36, could be shorter than the lengths of the sidewalls 42 and 44. Furthermore, if desired, the substantially rectangular tethers 30a, 30b may be of different sizes.

FIG. 4 illustrates the installed airbag module as it would be configured prior to actuation. The endplates of the reaction canister 40 are omitted to better show the internal construction. The base 46 of the reaction canister contains a cylindrical inflator 52. A diffuser plate 54 forms a shelf upon which rests a folded airbag 56. It will be noted that the only connection between the reaction canister 40 and the deployment door 10 is the flexible tethers 30a, 30b. No other fasteners are required.

Figure 5:
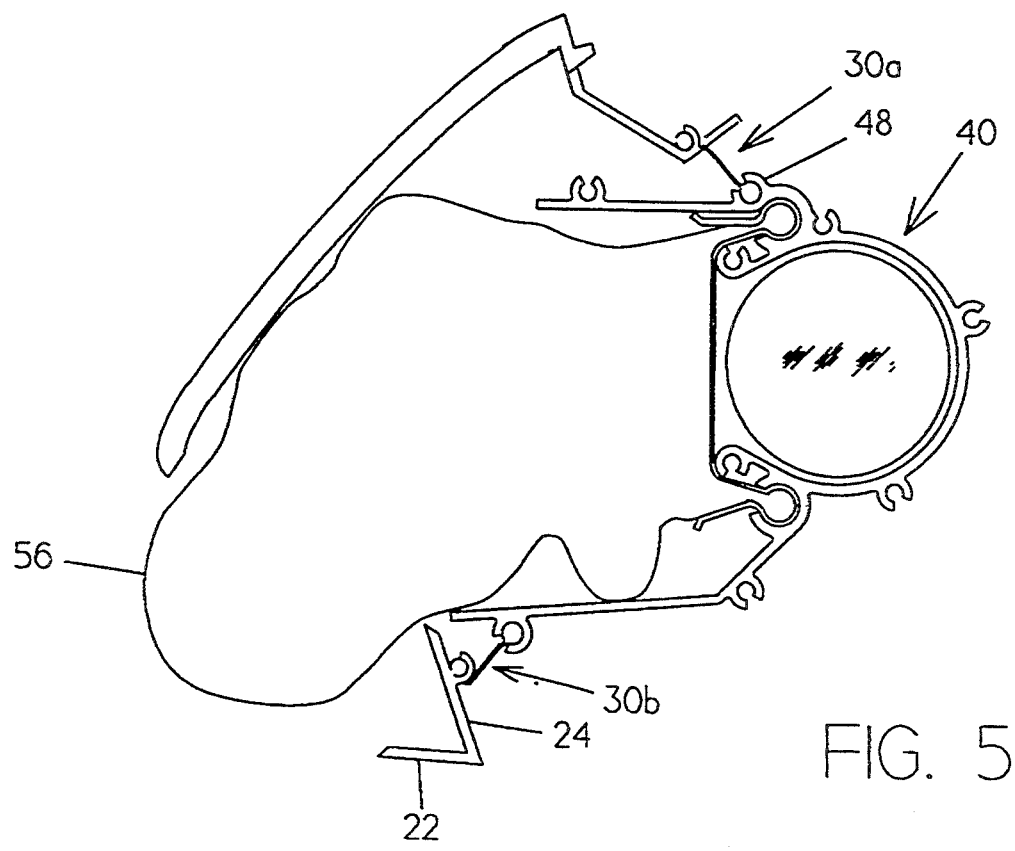
FIG. 5 is a view similar to FIG. 4 illustrating the action of the invention during airbag deployment.

When a crash occurs, the crash sensor activates the inflator 52 which immediately begins to produce a quantity of inflating gas. The gas passes through openings in the diffuser plate 54 and into the open mouth of the airbag 56. The airbag thereupon begins to expand as shown in FIG. 5, rupturing the deployment door along tearline 28 and causing the door to open as illustrated permitting the airbag to enter the passenger compartment. The tether 30a restrains the major portion of the deployment door, thereby preventing it from becoming a projectile. The other tether 30b similarly restrains the extension shelf 24 and mounting bracket 22 should they become detached from their structural support.

It is believed that the many advantages of this invention will now be apparent to those skilled in the art. It will also be apparent that a number of modifications may be made therein without departing from its spirit and scope. Accordingly, the foregoing description is to be construed as illustrative only, rather than limiting. This invention is limited only by the scope of the following claims.

We claim:

1. In a passenger-side airbag module for a motor vehicle of the type comprising a substantially trough-shaped reaction canister including first and second sidewalls defining an open top, an inflator within said canister, a folded airbag within said canister between said sidewalls, a deployment door, having opposing first and second edges and a weakened or tear line portion, closing the open top of said canister, and means for securing the deployment door to the canister, the improvement wherein said securing means permits relative movement between the door and canister and comprises:

a first substantially rectangular flexible tether having first and second elongated edges;
first securing means for connecting the first elongated edge of said first tether to said first sidewall, said first securing means comprises a first channel located on said first sidewall and a first rod carried by said first elongated edge of said first tether retained within said first channel;
second securing means for connecting the second elongated edge of said first tether to the first edge of said deployment door, said second securing means comprises a second channel carried by the first edge of said deployment door and a second rod carried by the second elongated edge of said first tether and retained within said second channel by a snap-fit engagement;
a second substantially rectangular flexible tether having first and second elongated edges;
third securing means for connecting the first elongated edge of said second tether to said second sidewall; and
fourth securing means for connecting the second elongated edge of said second tether to the second edge of said deployment door.

2. The improvement of claim 1 wherein each of said first and second tethers is nylon.

3. The improvement of claim 1 wherein said third securing means comprises:

a third channel carried by said second sidewall; and
a third rod carried by the first elongated edge of said second tether retained within said third channel.

4. The improvement of claim 3 wherein said first and third channels are longitudinal semi-cylindrical channels having a longitudinal slot opening therein and said first and third rods are retained in said first and third channels with the first and second flexible tethers extending through the slot openings in said first and third channels.

5. The improvement of claim 3 wherein each of said tethers is nylon.

6. The improvement of claim 5 wherein said first and third channels are longitudinal semi-cylindrical channels having a longitudinal slot opening therein and said first and third rods are retained in said first and third channels with the first and second flexible tethers extending through the slot openings in said first and third channels.

7. The improvement of claim 1 wherein said fourth securing means comprises:

a fourth channel carried by the second edge of said deployment door; and
a fourth rod carried by the second elongated edge of said second tether retained within said fourth channel.

8. The improvement of claim 7 wherein said third securing means comprises:

a third channel carried by said second sidewall; and
a third rod carried by the first elongated edge of said second tether retained within said third channel.

9. The improvement of claim 8 wherein said fourth rod is retained within said fourth channel by a snap-fit engagement.

10. The improvement of claim 9 wherein each of said tethers is nylon.

11. The improvement of claim 9 wherein said first and third channels are longitudinal semi-cylindrical channels having a longitudinal slot opening therein and said first and third rods are retained in said first and third channels with the first and second flexible tethers extending through the slot openings in said first and third channels.

12. The improvement of claim 8 wherein said first and third channels are longitudinal semi-cylindrical channels having a longitudinal slot opening therein and said first and third rods are retained in said first and third channels with the first and second flexible tethers extending through the slot openings in said first and third channels.

13. The improvement of claim 8 wherein the second and fourth channels are segmented channels.

14. The improvement of claim 7 wherein said fourth rod is retained within said fourth channel by a snap-fit engagement.

15. The improvement of claim 14 wherein each of said tethers is nylon.

16. The improvement of claim 15 wherein said first and third channels are longitudinal semi-cylindrical channels having a longitudinal slot opening therein and said first and third rods are retained in said first and third channels with the first and second flexible tethers extending through the slot openings in said first and third channels.

17. In a passenger-side airbag module for a motor vehicle of the type comprising a substantially trough-shaped reaction canister including first and second sidewalls defining an open top, an inflator within said canister, a folded airbag within said canister between said sidewalls, a deployment door, having opposing first and second edges and a weakened or tear line portion, closing the open top of said canister, and means for securing the deployment door to the canister, the improvement wherein said securing means permits relative movement between the door and canister and comprises:

a first substantially rectangular flexible tether having first and second elongated edges;

first securing means for connecting the first elongated edge of said first tether to said first sidewall, said first securing means comprises a first channel carried by said first sidewall and a first rod carried by the first elongated edge of said first tether retained within said channel; and second securing means for connecting the second elongated edge of said first tether to the first edge of said deployment door, said second securing means comprises a second channel carried by the first edge of said deployment door and a second rod carried by the second elongated edge of said first tether and retained within said second channel by a snap-fit engagement.

18. The improvement of claim 17 wherein said tether is nylon.

19. The improvement of claim 17 wherein said first channel is a longitudinal semi-cylindrical channel having a longitudinal slot opening therein and said first rod is retained in said first channel with the first flexible tether extending through the slot opening in said first channel.

20. The improvement of claim 17 wherein the second channel is a segmented channel.

* * * * *